(12) United States Patent
Wilson et al.

(10) Patent No.: US 11,597,234 B2
(45) Date of Patent: Mar. 7, 2023

(54) FIXTURE FOR SPOKE TO HUB ATTACHMENT FOR A NON-PNEUMATIC TIRE

(71) Applicant: Compagnie Generale des Etablissements Michelin, Clermont-Ferrand (FR)

(72) Inventors: Brian D Wilson, Greer, SC (US); Eric Rivers, Greenville, SC (US); David Alan Goodenough, Bridgman, MI (US); Glenn Andrew Schimdke, Smyrna, TN (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 949 days.

(21) Appl. No.: 16/464,285

(22) PCT Filed: Dec. 28, 2017

(86) PCT No.: PCT/US2017/068634
§ 371 (c)(1),
(2) Date: May 27, 2019

(87) PCT Pub. No.: WO2018/125959
PCT Pub. Date: Jul. 5, 2018

(65) Prior Publication Data
US 2020/0276863 A1 Sep. 3, 2020

Related U.S. Application Data

(63) Continuation of application No. PCT/US2016/069402, filed on Dec. 30, 2016.

(51) Int. Cl.
*B29D 30/02* (2006.01)
*B60B 31/00* (2006.01)
(Continued)

(52) U.S. Cl.
CPC ........ *B60B 31/005* (2013.01); *B29C 65/7802* (2013.01); *B29D 30/02* (2013.01);
(Continued)

(58) Field of Classification Search
CPC ......... B29D 30/02; B60B 31/005; B60B 5/02; B60C 7/10; B60C 7/102; B60C 7/107;
(Continued)

(56) References Cited

U.S. PATENT DOCUMENTS

| 39,275 A | * | 7/1863 | Cook | ................... B60B 31/005 157/2 |
| 103,669 A | | 5/1870 | Shogren | |

(Continued)

FOREIGN PATENT DOCUMENTS

| CN | 202911477 U | 5/2013 |
| JP | H0796708 A | 4/1995 |
| JP | 2011025759 A | 2/2011 |

OTHER PUBLICATIONS

European Patent Office; International Search Report and Written Opinion for patent application PCT/US2016/069402; dated Oct. 20, 2017; Publisher: European Patent Office, Rijswijk, Netherlands, pp. 1-12, enclosed.

(Continued)

*Primary Examiner* — Geoffrey L Knable
(74) *Attorney, Agent, or Firm* — Neal P. Pierotti

(57) ABSTRACT

An apparatus for assembling a non-pneumatic tire that includes a base and a plurality of elements that move relative to the base. The plurality of elements have a central axis, and the elements are disposed in a circumferential direction around the central axis and move in a radial direction towards and away from the central axis. A radial movement member, hub, and a plurality of spokes are also present. Each one of the spokes is disposed between adjacent ones of (Continued)

the elements. The elements and the spokes are moved inwards in the radial direction by the radial movement member towards the central axis so that the spokes are moved in the radial direction towards the hub. Adhesive engages the spokes and the hub at an attachment location of the spokes and the hub.

14 Claims, 7 Drawing Sheets

(51) Int. Cl.
*B60B 5/02* (2006.01)
*B60B 9/26* (2006.01)
*B60B 23/00* (2006.01)
*B60B 31/02* (2006.01)
*B29C 65/78* (2006.01)
*B60C 7/10* (2006.01)

(52) U.S. Cl.
CPC ............... *B60B 5/02* (2013.01); *B60B 9/26* (2013.01); *B60B 23/00* (2013.01); *B60B 31/02* (2013.01); *B60C 7/102* (2013.01); *B60C 7/107* (2021.08)

(58) Field of Classification Search
CPC ..... B60C 7/00; B29C 43/12; B29C 2043/185; B29C 65/48; B29C 65/78; B29C 65/7802–7838
See application file for complete search history.

(56) References Cited

U.S. PATENT DOCUMENTS

| | | | |
|---|---|---|---|
| 4,108,233 A | | 8/1978 | Baer et al. |
| 10,870,314 B2* | | 12/2020 | Wilson ................... B60B 23/00 |
| 2014/0070439 A1 | | 3/2014 | Martin |
| 2019/0001744 A1* | | 1/2019 | Delfino ................... B60C 7/14 |
| 2019/0047328 A1* | | 2/2019 | Rivers ................... B29D 30/02 |

OTHER PUBLICATIONS

European Patent Office; International Search Report and Written Opinion for patent application PCT/US2017/068634; dated Mar. 27, 2018; Publisher: European Patent Office, Rijswijk, Netherlands, pp. 1-11, enclosed.

* cited by examiner

FIXTURE FOR SPOKE TO HUB ATTACHMENT FOR A NON-PNEUMATIC TIRE

CROSS-REFERENCE TO RELATED APPLICATIONS

The present application is a 35 U.S.C. § 371 application of PCT/US17/68634 filed on Dec. 28, 2017 and entitled "Fixture for Spoke to Hub Attachment for A Non-Pneumatic Tire." PCT/US17/68634 claims the benefit of PCT/US16/69402 filed on Dec. 30, 2016 and entitled "Fixture for Spoke to Hub Attachment for a Non-Pneumatic Tire." PCT/US17/68634 and PCT/US16/69402 are both incorporated by reference herein in their entireties for all purposes.

FIELD OF THE INVENTION

The subject matter of the present invention relates to fixtures for the production of non-pneumatic tires. More particularly, the present application involves a fixture that includes elements that move radially inward to cause spokes within the fixture to be adhered onto an outer surface of a hub of a non-pneumatic tire.

BACKGROUND OF THE INVENTION

Non-pneumatic tires are those that do not require air. These tires instead feature a hub that is mounted onto a wheel of a vehicle, and a series of spokes that extend radially outward from the hub. The spokes can be attached to a shear band that includes tread of the tire. The spokes can be arranged and manufactured in a number of ways. Further, any number of spokes can be used in the design of non-pneumatic tires. However, when large numbers of spokes are used manufacturing problems arise. The large numbers of spokes require the spokes be positioned close to one another, and in these instances the spokes cannot be formed with the hub as part of a complete assembly. For a non-pneumatic tire to be constructed in a uniform manner, the circumferential and lateral precision of location of the spokes should be within 0.2 millimeters. Further, variations in spokes to spoke flange thicknesses exist in the manufacture of spokes, which also should be taken into account in any subsequent assembly process. Due to the various manufacturing challenges associated with the production of non-pneumatic tires, a mechanism for addressing and improving upon issues associated with their production would be beneficial.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
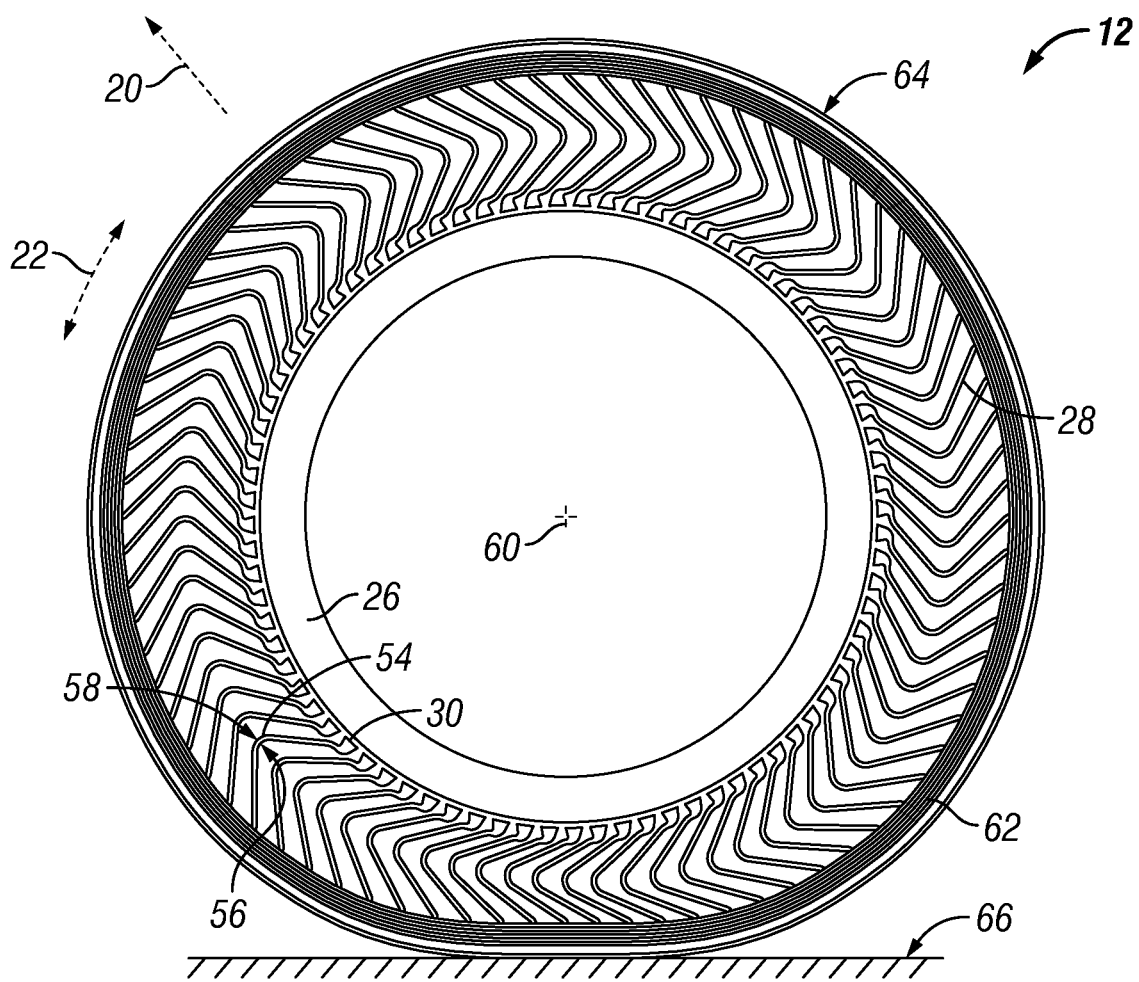
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that is used in the construction of a non-pneumatic tire 12. The non-pneumatic tire 12 has a plurality of spokes 28 that are connected to a hub 26. The apparatus 10 includes a number of elements 16 disposed about a central axis 18 in which the spokes 28 are disposed between successive elements 16 in the circumferential direction 22. The elements 16 have a profile close to the profile of the spokes 28 but not the same as the spokes 28. The hub 26 of the non-pneumatic tire 12 is placed into the apparatus 10, and one or more radial movement members 24 of the apparatus 10 are actuated in order to press the elements 16 and the spokes 28 inward in the radial direction 20. The spokes 28 engage the hub 26 and adhesion is used to cause them to be connected to one another. The radially inward movement of the elements 16 and their profiled shape cause the spokes 28 to be precisely aligned and positioned on the hub 26 for a consistent, and known manufacture of the non-pneumatic tire 12.

FIG. 1 shows a non-pneumatic tire 12 in accordance with one exemplary embodiment. The non-pneumatic tire 12 has an axis 60 at its center, and the radial direction 20 extends from the axis 60. Tread 64 is located on the outer exterior of a shear band 62 and extends all the way around the non-pneumatic tire 12 in the circumferential direction 22. The shear band 62 is located inward in the radial direction 20 from the tread 64 and likewise extends 360 degrees around the axis 60 in the circumferential direction 22. A series of spokes 28 engage the shear band 62 and extend inward in the radial direction 20 from the shear band 62 to a hub 26 of the non-pneumatic tire 12. Any number of spokes 28 can be present, and their cross-sectional shape can be different form that shown. In some embodiments, from 64-80 spokes 28 are present in the non-pneumatic tire 12. The hub 26 is located inward from the spokes 28 in the radial direction 20 and can be mounted onto a wheel of the vehicle. The spokes 28 at the top of the non-pneumatic tire 12 are in tension, and the spokes 28 at the bottom are in compression as the non-pneumatic tire 12 rests on the ground 66 and as the non-pneumatic tire 12 turns in normal operation of the vehicle.

Figure 2:
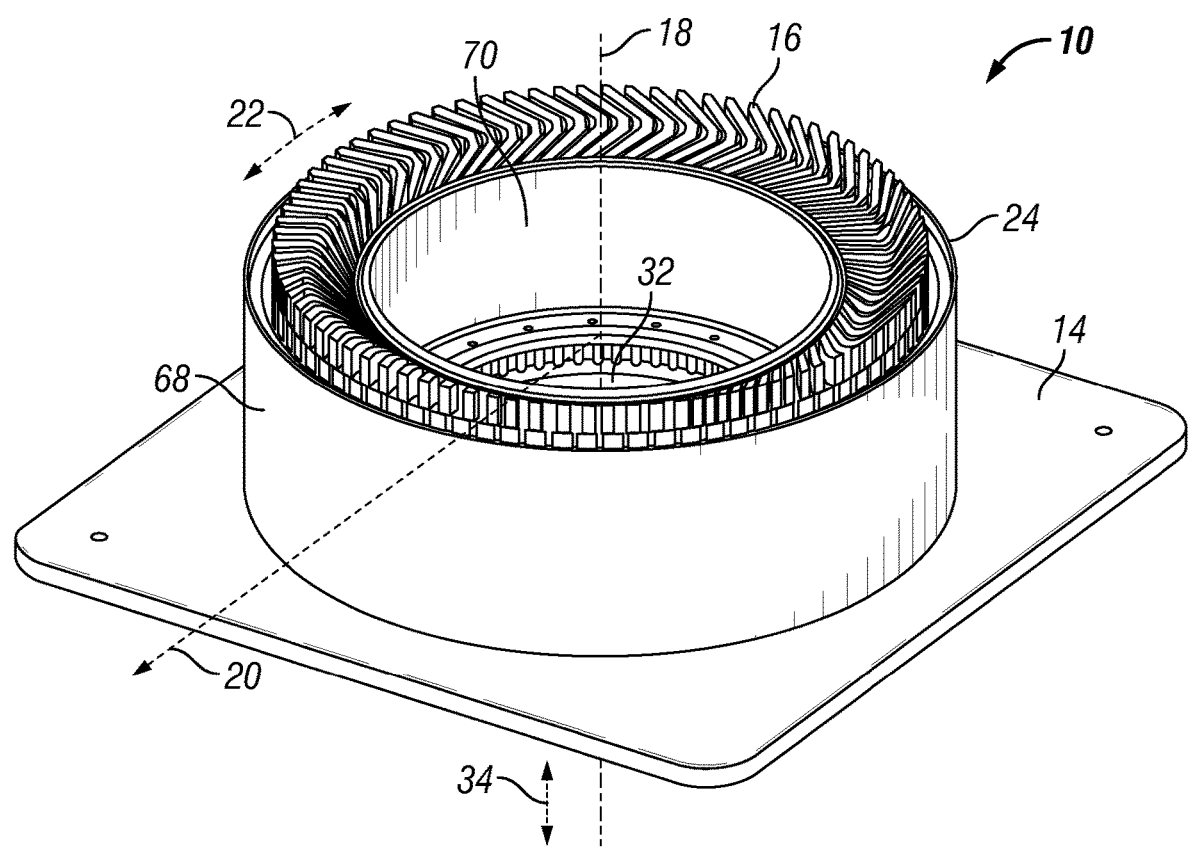
FIG. 2 is a perspective view of an apparatus for forming a non-pneumatic tire in accordance with one exemplary embodiment.

The apparatus 10 is a mechanism that attaches the spokes 28 of the non-pneumatic tire 12 to the hub 26. The spokes 28 and hub 26 are pre-formed and are placed into the apparatus 10 at which time they are attached to one another. FIG. 2 shows one embodiment of the apparatus 10 that includes a base 14 that carries a series of elements 16. The base 14 may be of any shape and is under the elements 16 and functions to support the elements 16. The base 14 is shown as being rectangular in shape and has an open central aperture 32. The base 14 may be in the shape of a ring in other versions, and need not have a central aperture 32 in other versions of the apparatus 10. The elements 16 are arranged in the circumferential direction 22 completely around a central axis 18 of the elements 16. The elements 16 are spaced from the central axis 18 in the radial direction 20 and do not intersect the central axis 18. The elements 16 can all be shaped identically with one another, or there may be certain elements 16 that are different from other elements 16 with respect to their size or shape. The central aperture 32 is positioned so that the central axis 18 extends through the center of the central aperture 32. A longitudinal direction 34 of the apparatus 10 extends in the direction of the central axis 18 and can be parallel to the central axis 18.

Figure 3:
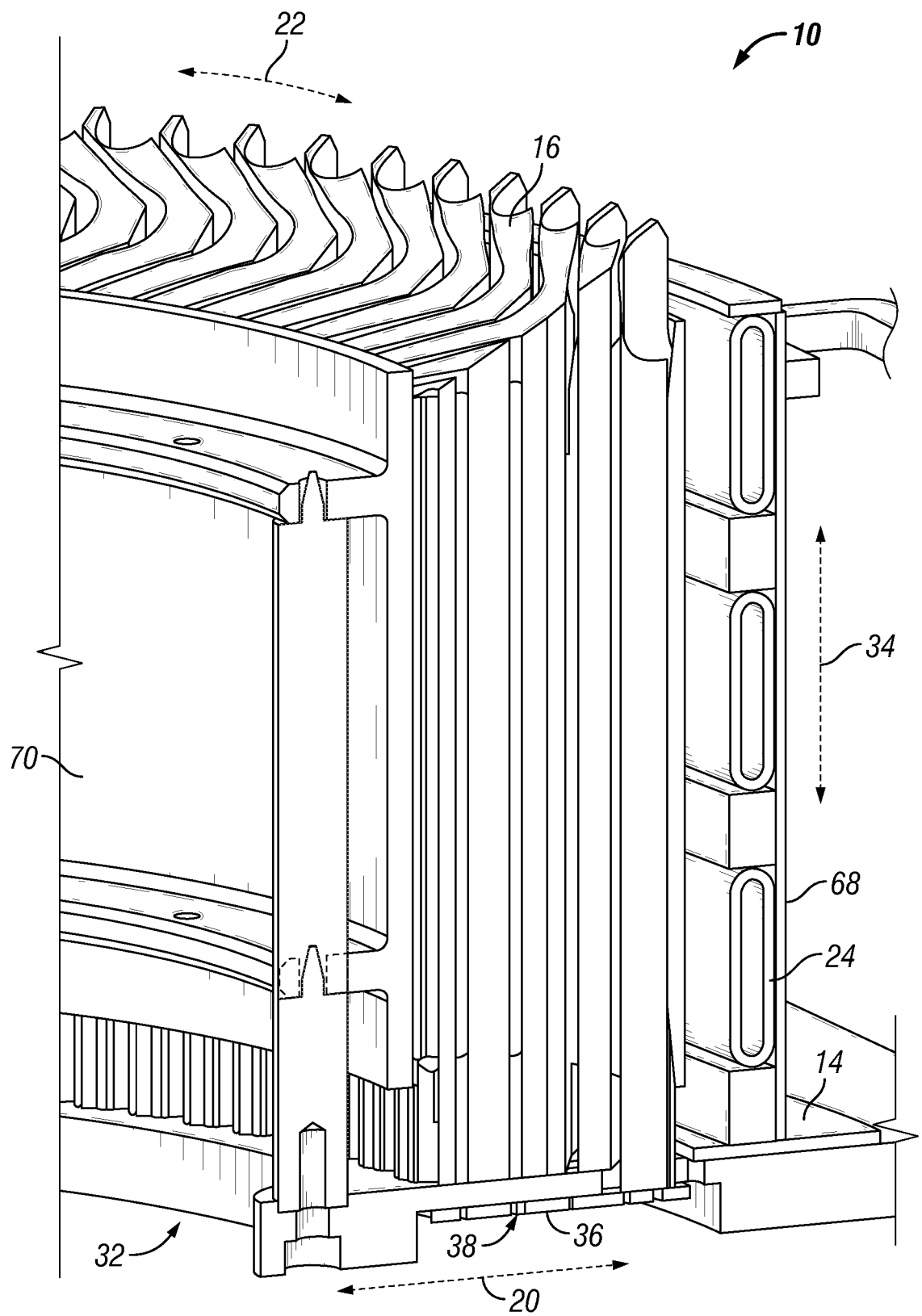
FIG. 3 is a perspective view of a portion of the apparatus cut through a section of the apparatus.

FIG. 3 is a cut-away view of a section of the apparatus 10 in a perspective orientation. The elements 16 are situated in the radial direction 20 between a radially inward support member 70 and a support member 68 of the apparatus 10. The support member 68 extends upwards from the base 14 in the longitudinal direction 34 and houses the radial movement member 24. The radial movement member 24 is composed of three bladders that are disposed within pockets of the support member 68 and are separate from one another. The radial movement members 24 extend 360 degrees completely around the central axis 18 in the circumferential direction 22. Air or other gas may be used to inflate the bladders of the radial movement member 24 and cause their expansion inward in the radial direction 20 from their positions shown in FIG. 3. The presence of the support member 68 prevents expansion of the bladders outward in the radial direction 20 from the positions shown in FIG. 3. The bladders of the radial movement member 24 engage the spokes 28 and/or the elements 16 and push these members 28, 16 inward in the radial direction 20 towards the central axis 18.

The three bladders of the radial movement member 24 can be simultaneously inflated at the same time, and at the same amount of pressure. Alternatively, they can be inflated at different times with different amounts of pressure as desired to prevent a binding condition of the guide surfaces or other reasons. In this regard, the bladder 24 that is closest to the tabs 36 in the longitudinal direction 34 can be inflated first before the other two bladders 24, and a flow control system can be used to coordinate this sequential inflation. Subsequently, the bladder 24 that is in the middle in the longitudinal direction 34 can be inflated, and then subsequently after that the bladder 24 that is farthest away from the tabs 36 in the longitudinal direction 34 can be last inflated. Inflation of the bladders 24 in this sequential order allow the spokes 28 and the elements 16 to be urged against and to the hub 26 before significant pressure is applied by the other bladders 24 to prevent binding of the guiding surfaces.

Although three bladders are shown, it is to be understood that the radial movement member 24 can have any number of bladders in other embodiments. For instance, 1, 2, from 4-6, or up to 10 bladders can be present. Also, each one of the bladders need not extend completely around the central axis 18 in the circumferential direction 22 but can extend less than 360 degrees. Although shown as employing bladders to cause movement in the radial direction, the radial movement member 24 need not have bladders in other arrangements of the apparatus 10. For example, pneumatic or hydraulic cylinders of the radial movement member 24 could be used to effect inward radial motion in some arrangements. In other instances, the radial movement member 24 could employ ball screws, linkages, linear solenoids, or other mechanisms to achieve radial movement of the elements 16 and spokes 28.

The apparatus 10 includes series of locator pins 70 that can be part of the base 14 that are disposed about the central axis 18. The locator pins 70 support the hub 26 that has a bearing surface that has a convex face that faces outward in the radial direction 20. This bearing surface can extend 360 degrees in the circumferential direction 22 about the central axis 18 and can be attached at two different vertical locations to the locator pins 70, although any number of locator pins 70 may be implemented in other exemplary embodiments. The hub 26 defines a boundary in the radial direction 20 in that the elements 16 and the spokes 28 cannot be moved radially inward of the hub 26 in the radial direction 20.

Figure 4:
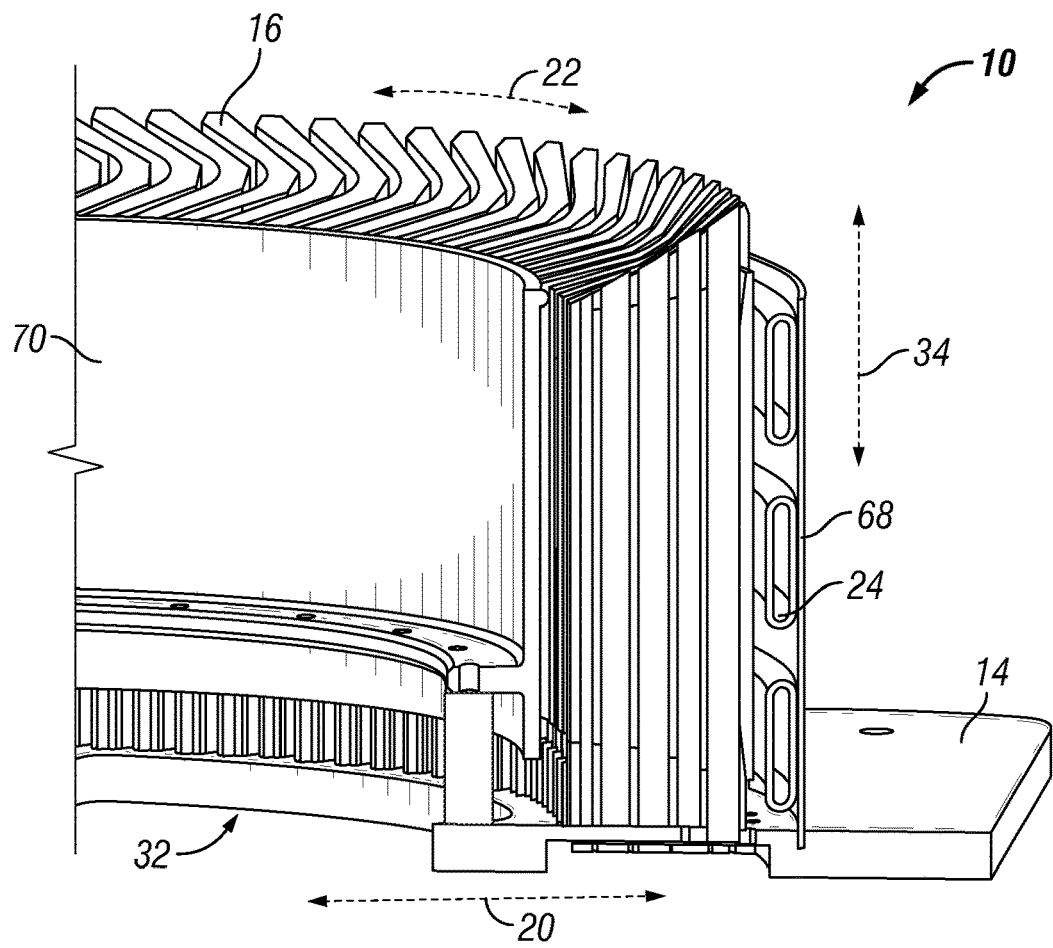
FIG. 4 is a perspective view of a portion of the apparatus cut through a section of the apparatus.

FIG. 4 shows another variation of the embodiment of the apparatus 10 shown in FIG. 3. Here, the locator pins 70 extends in the longitudinal direction 34 from the other portions of the base 14. The hub 26 is mounted to the locator pins 70 has a bearing surface with a convex outer surface. The hub 26 is mounted at only one location of the base in the longitudinal direction 34. The locator pins 70 and the mounting of the hub 26 may thus be designed in a variety of manners in accordance with different embodiments of the apparatus 10. One example of an element 16 is shown in perspective view in FIG. 5. The element 16 has a cross-sectional profile that is V-shaped, and the element 16 is elongated in the longitudinal direction 34 so that it has a longer longitudinal length than a radial length. One or more tabs 36 can be included on the bottom of the element 16 for purposes of constraining movement of the element 16 on the base 14. A dividing line 43 is associated with the element 16 and this dividing line 43 marks the boundary between a radially outer half 42 and a radially inner half 44 of the element 16. A projection of the element 16 is located at the radially inner half 44. The radially inner half 44 is located closer to the central axis 18 in the radial direction 20 than the radially outer half 42. The halves 42, 44 are equal in length in the radial direction 20, but can have lengths that extend in the circumferential direction 22 that are different from one another, can have shapes that are different than one another, and can have thicknesses different from one another. The thicknesses of the halves 42, 44 is their lengths in the circumferential direction 22. The elements 16 can be aluminum extrusions that are subsequently machined. Alternatively, the elements 16 may be made out of other materials such as high modulus plastic.

Figure 5:
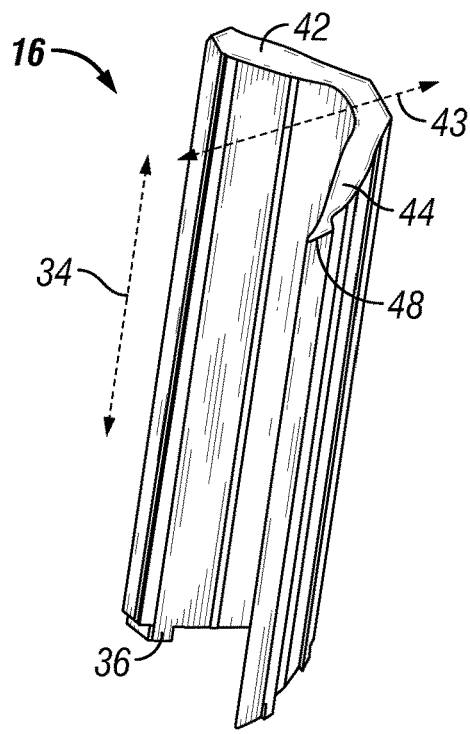
FIG. 5 is a perspective view of an element.
Figure 6:
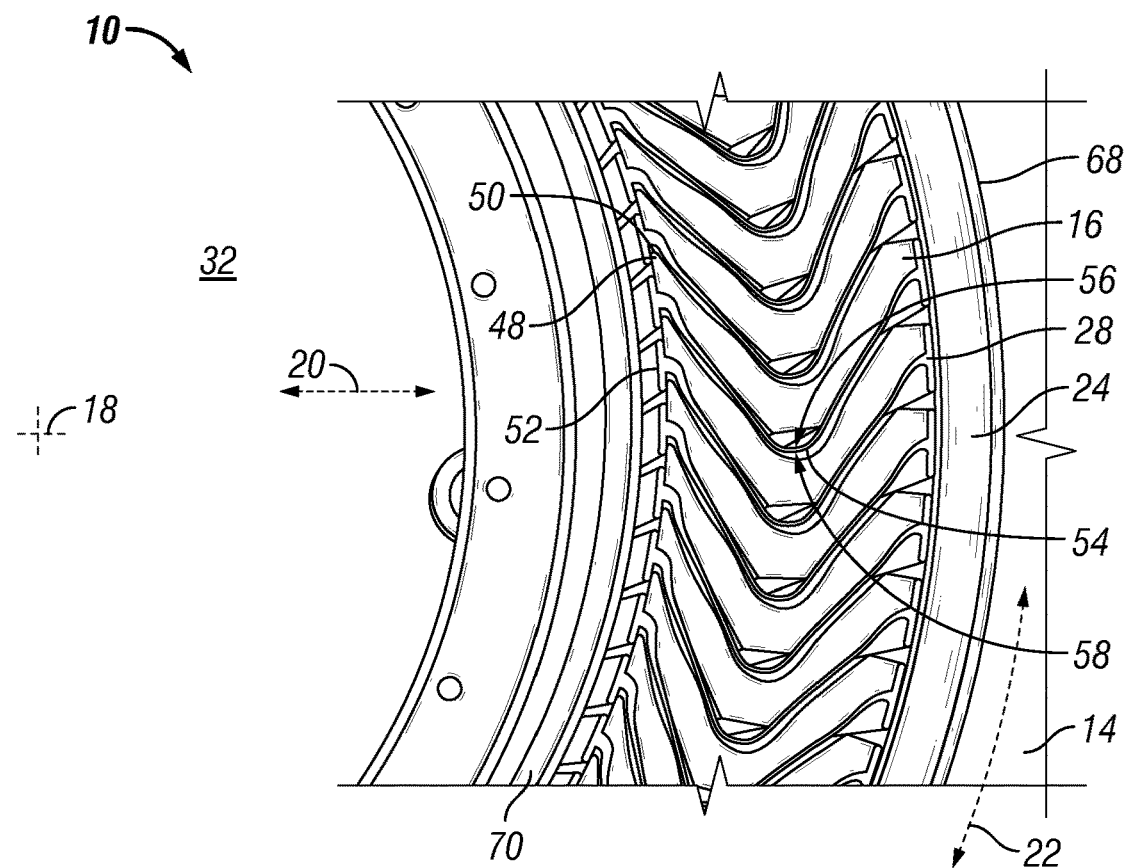
FIG. 6 is a top view of a portion of the apparatus.

FIG. 6 shows the elements 16 of FIG. 5 positioned within the apparatus 10. Spokes 28 are also shown in FIG. 6 and are disposed between the elements 16 so that one spoke 28 is bordered on either side by a separate element 16. The number of spokes 28 may be the same as the number of elements 16. The spokes 28 have a V-shape that is similar to the profile shape of the elements 16, although the cross-sectional shapes of the spokes 28 and the elements 16 are not exact. The radial movement member 24 can move inwards in the radial direction 20 and engage the ends of the spokes 28. The spokes 28 will move inward, and as they engage the ends of the elements 16, the elements 16 will also move inwards in the radial direction 20 when the radial movement member 24 moves inwards. There is a greater amount of space between the spokes 28 and the elements 16 in at the radially outer halves 42 than at the radially inner halves 44. This is because as the elements 16 move closer to the central axis 18, less space is available at the radially outer portions of the elements 16 and spokes 28 and these components become tighter with one another. The hub 26 is now shown in FIG. 6 for purposes of clarity, but would be located between the radially inward support member 70 and the terminal ends of spokes 28.

Figure 7:
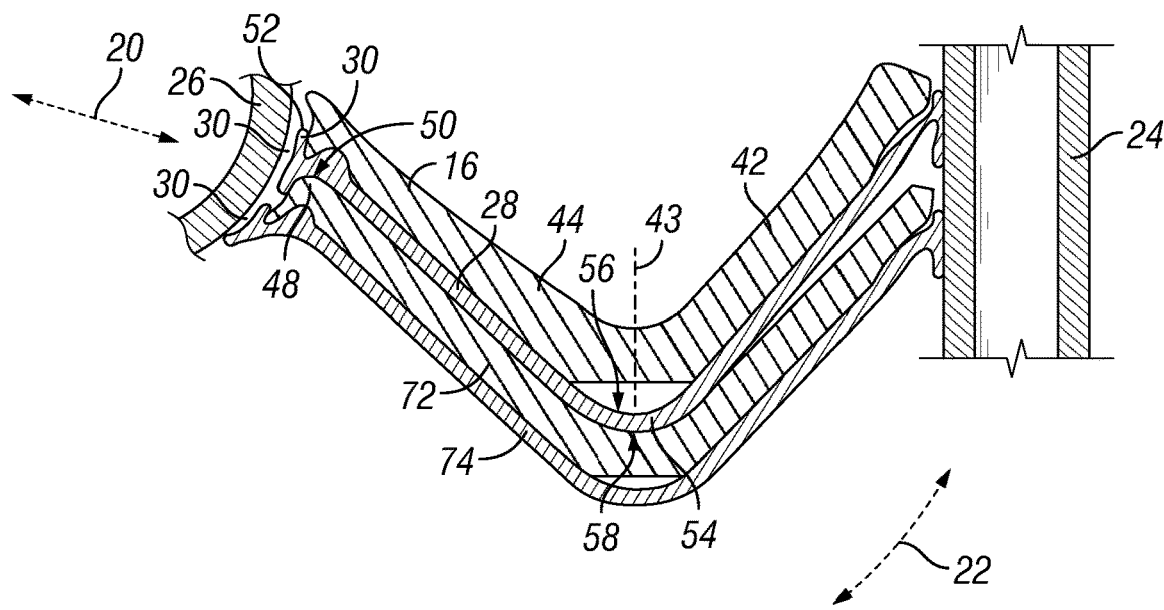
FIG. 7 is detailed top view of a portion of the apparatus that shows the interaction of elements, spokes, hub, and radial movement member.

FIG. 7 is a cross-sectional view that shows the interaction between the spokes 28, elements 16, hub 26, and radial movement member 24. A second element 72 and a second spoke 74 are identified for purposes of description. The elements 16, 72 and spokes 28, 74 are shown with the radial movement member 24 in an unactuated state so that the elements 16, 72 and spokes 28, 74 are not pushed inwards in the radial direction 20. There is a larger amount of space between the adjacent radially outer halves 42 of the elements 72, 74 than the adjacent radially inner halves 44 of the elements 72, 74. The radial movement member 24 does not engage the elements 16, 72. Instead, the radial movement member 24 engages the spokes 28, 74 so that inward pushing of the spokes 28, 74 is translated to inward movement of the elements 16, 72. In some embodiments this is not the case and there is enough space between lips of spokes 28, 74 so that a portion of the second element 72 can extend beyond the lips of spokes 28, 74 in the radial direction 20 and engage the radial movement member 24. In these instances, the spokes 28, 74 do not make contact with the radial movement member 24, and force from the radial movement member 24 is transmitted directly into the elements 16, 72. For example, in FIG. 4 the bladders 24 may engage the elements 16, and the spokes 28 may or may not also be engaged by the bladders 24. The spoke 16 can engage a portion of the radially outer half 42 of the element 16, but not all of the radially outer half 42.

The spoke 28 has a central portion 54 that has a concave inner surface 56 and a convex outer surface 58. The concave inner surface 56 faces element 16 but does not engage element 16. The convex outer surface 58 engages adjacent second element 72. The portion of the element 16 that directly faces the concave inner surface 56 is not convex in shape, but instead has a flat shape and a space is between this flat surface and the concave inner surface 56. The radially inner half 44 of the element 16 is in engagement with the spoke 28 along a portion of its length, but not along its entire length. The length of engagement in the radial direction 20 between the spoke 28 and the element 16 may be greater in at the radially inner half 44 than at the radially outer half 42. In a similar manner, the spoke 28 may have a longer length of engagement with the second element 72 at the radially inner half of the second element 72 than at the radially outer half of the second element 72. Surface engagement between the spokes 28, 74 and the elements 16, 72 along the radially inwards surfaces allows control of the position of the spokes 28, 74 as they are positioned with respect to the hub 26. There is relief between the profile of the elements 16, 72 and spokes 28, 74 in other areas to reduce drag or friction between surfaces during loading of spokes 28, 74 and removal of the assembly from the fixture.

The radially inner end of the spoke 28 includes a flange 52 that can engage the hub 26. The terminal end of the flange 52 may curve in the circumferential direction 22 so that it forms a concave surface that directly faces, and is complimentary to, the convex outer surface of the hub 26. The spoke 28 may define a notch 50 at a location outward from the flange 52 in the radial direction 20. The flange 52 and the notch 50 are at the radially inner halves of the spokes 28, 74. The elements 16, 72 have projections 48 at their radially inner halves 44, and the projection 48 nests within the notch 50. The projections 48 can be complimentary in shape to the notches 50 so that the notches 50 are completely filled by the projections 48 only when the spokes 28, 74 and elements 16, 72 have been moved radially inward to the farthest extent and contact has been made to sufficiently adhere the spokes 28, 74 to the hub 26. The elements 16, 72 do not engage the hub 26 when the radial movement member 24 is fully actuated. The projections 48 may be within the notches 50 at all times the spokes 28, 74 are between the elements 16, 72 at all distances in the radial direction 20 and regardless of whether the radial movement member 24 is or is not actuated. The radially inner terminal ends of the elements 16, 72 can simultaneously engage flanges 52 of two adjacent spokes 28, 74 when the radial movement member 24 is fully actuated, and in some instances when the radial movement member 24 is not actuated at all and when actuated at all in between levels of actuation. Adhesive 30 is located between the hub 26 and flange 52 and functions to hold the spokes 28, 74 to the hub 26. The flanges 52 can be variously shaped in other embodiments. In some instances, they can be triangular in shape and the notch 50 can be shaped differently than as shown or may not even be present in some embodiments. The elements 16 can be disposed within the notches 50 of the flanges 52 when the flanges 52 are triangular in shape, or the elements 16 may not be disposed within the notches 50 even if the notches are present.

To assemble the non-pneumatic tire 12, the spokes 28 are first molded and then inserted into the apparatus 10 so that each one is between two of the elements 16. The spokes 28 may be molded in individual molding cavities. The elements 16 can be located in the most outward position in the radial direction 20 before the elements 16 are inserted. Loading of the spokes 28 may be accomplished by an automated handling device that loads the spokes 28 from the top of the apparatus 10, that is in a direction towards the base 14. Alternatively, the spokes 28 may be manually loaded. The hub 26 may be independently formed and then inserted into the apparatus 10 and directly faces the spokes 28 when the spokes 28 are inserted and present. Prior to insertion into the apparatus 10, beads of adhesive 30 are applied to the hub 26 at locations that align with the flanges 52 on the spokes 28. A robot and adhesive dispenser may be used to place the adhesive 30 onto the hub 26. The adhesive 30 can be applied in linear strips around the circumference of the hub 26 that extend in the longitudinal direction 34. The adhesive 30 can separate the spokes 28 from the hub 26 so that they do not touch one another, or in some embodiments the spokes 28 and hub 26 may touch one another even with the presence of adhesive 30 used to bond these two components 26, 28 together.

Next, the radial movement member 24 can be actuated by inflating the membranes of the radial movement member 24 to cause the elements 16 to move inward in the radial direction 20. This actuation will also cause the spokes 28 to move inward in the radial direction 20 to achieve contact with the hub 26. The radial movement member 24 may maintain pressure on the spokes 28 to cause the flanges 52 of the spokes 28 to maintain engagement with the adhesive 30 and the hub 26 until the adhesive 30 is set. The force imparted onto the spokes 28 is transferred to the hub 26 and the hub 26 is held in place upon application of this force in the radial direction 20. The membranes of the radial movement member 24 may in some embodiments be capped off so that the apparatus 10 can be moved to an oven or other location. Once the adhesive 30 is set, the assembly of the hub 26 and spokes 28 can be removed, and the spokes 28 will be attached to the hub 26.

The cross-sectional profiles of the elements 16 match up with some specific features of the spokes 28 and in some instances may be identically shaped and sized so as to receive portions of the spokes 28 or to be inserted into portions of the spokes 28. The cross-sectional profiles of the elements 16 may not completely match those of the spokes 28 along the entire radial lengths of the components 16, 28. The elements 16 can move in the radial direction 20 independently from one another, or may be linked to one another so that all of the elements 16 of the apparatus 10 move in concert with one another. As the radial movement member 24 is actuated, the interaction of the spokes 28 and the elements 16 creates a precise self-aligned condition while maintaining uniform control of adhesive contact pressure between the spoke 28 and the hub 26 regardless of minor variations of the spokes 28 or hub 26. The elements 16 achieve a self-aligning capability of the spokes 28 when they are attached to the hub 26. Further, the application of force by the radial movement member 24 can be independent of the movement of the spokes 28 and hub 26 in the longitudinal direction 34.

The elements 16 can align the spokes 28 and locate the spokes 28 onto a particular location of the hub 26 that is within plus or minus 0.2 millimeters in the desired circumferential direction 22. The elements 16 may also include stops 40 and other features built into their design that allow the spokes 28 to be located on the hub 26 to a precision of plus or minus 0.2 millimeters in the desired longitudinal direction 34. Encircling the elements 16 with the radial movement member 24 through the use of bladders causes the pressure applied onto the spokes 28 to be precisely controlled and adjustable. The application of uniform pressure to the spokes 28 achieves a consistent thickness of the adhesive 30 used to bond the spokes 28 to the hub 26. The arrangement of the elements 16 with the spokes 28 adjusts for spoke 28 to spoke flange 52 thickness variations. The elements 16 have a profile shape that is similar to, but not exact to that of the spokes 28 to result in a precisely aligned engagement to the hub 26 with uniform pressure applied thereto among all of the spokes 28.

Figure 8:
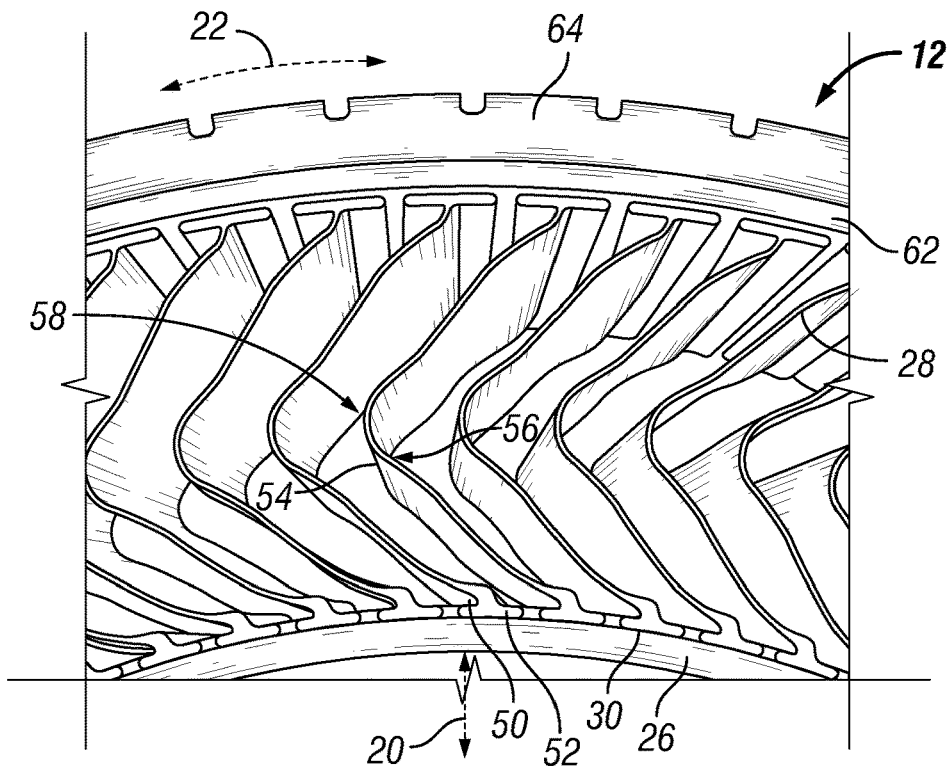
FIG. 8 is a side view of a portion of a non-pneumatic tire.

FIG. 8 shows an arc length segment of the non-pneumatic tire 12 in which the plurality of spokes 28 are engaged to and attached to the shear band 62 and the hub 26. The spokes 28 all feature a central portion 54 that has a convex outer surface 58 that faces a concave inner surface 56 of an adjacent spoke 28. The spokes 28 include flanges 52 that engage the hub 26, but may not engage flanges 52 of adjacent spokes 28. In some embodiments, the flanges 52 may in fact engage flanges 52 from adjacent spokes 28. The spokes 28 can be described as having a hairpin type spoke shape due to the central portion 54 that is V-shaped. The spokes 28 may be made from a thermoplastic material or from reinforced rubber.

Figure 9:
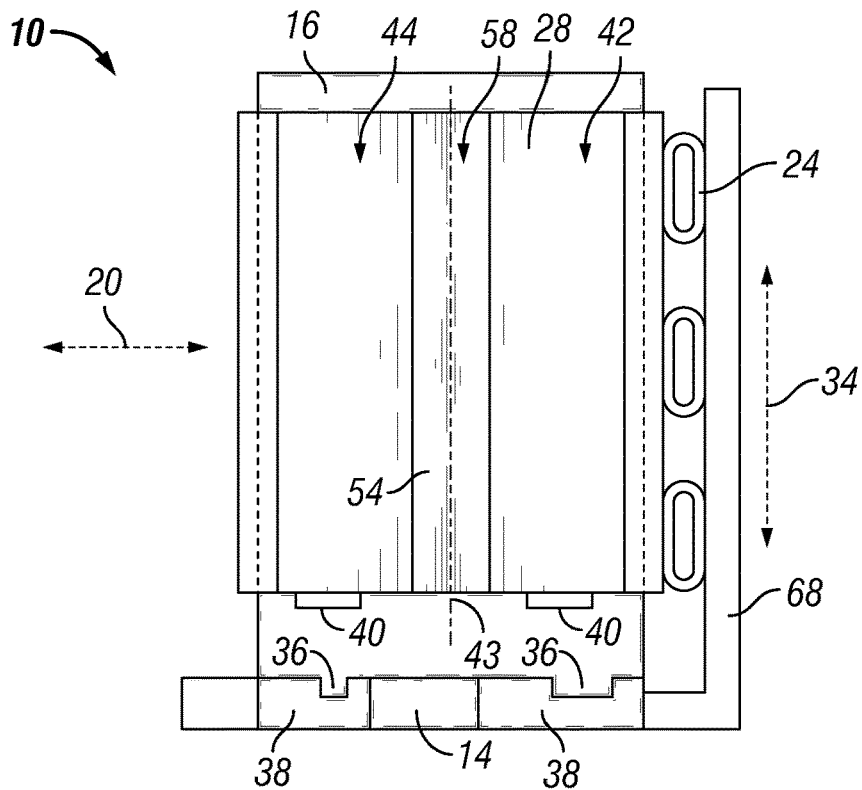
FIG. 9 is a partial cross-sectional view of the apparatus.

With reference to FIG. 9, the various elements 16 may include one or more stops 40. The stops 40 are spaced from the base 14 in the longitudinal direction 34 and engage the bottom ends of the spokes 28 when the spokes 28 are inserted between the elements 16. The stops 40 function to space the spokes 28 from the base 14 to keep the spokes 28 located a distance from the base 14 when the spokes 28 are attached to the hub 26. The elements 16 are also sized so that they extend in the longitudinal direction 34 a greater distance than the spokes 28 so that the top of the spokes 28 are located below the tops of the elements 16 when the spokes 28 are located between the elements 16. When located between elements 16, the elements 16 extend beyond the spokes 28 in both directions in the longitudinal direction 34. The spokes 28 may have a length in the radial direction that is greater than that of the elements 16 so that the spokes 28 extend radially beyond both ends of the elements 16. The elements 16 include tabs 36 at their bottoms that are received within corresponding slots 38 of the base 14. The tabs 36 slide within the slots 38 and the slots 38 direct the radial and circumferential movement of the elements 16 and prevent the elements 16 from moving to unwanted locations during use of the apparatus 10.

Figure 10:
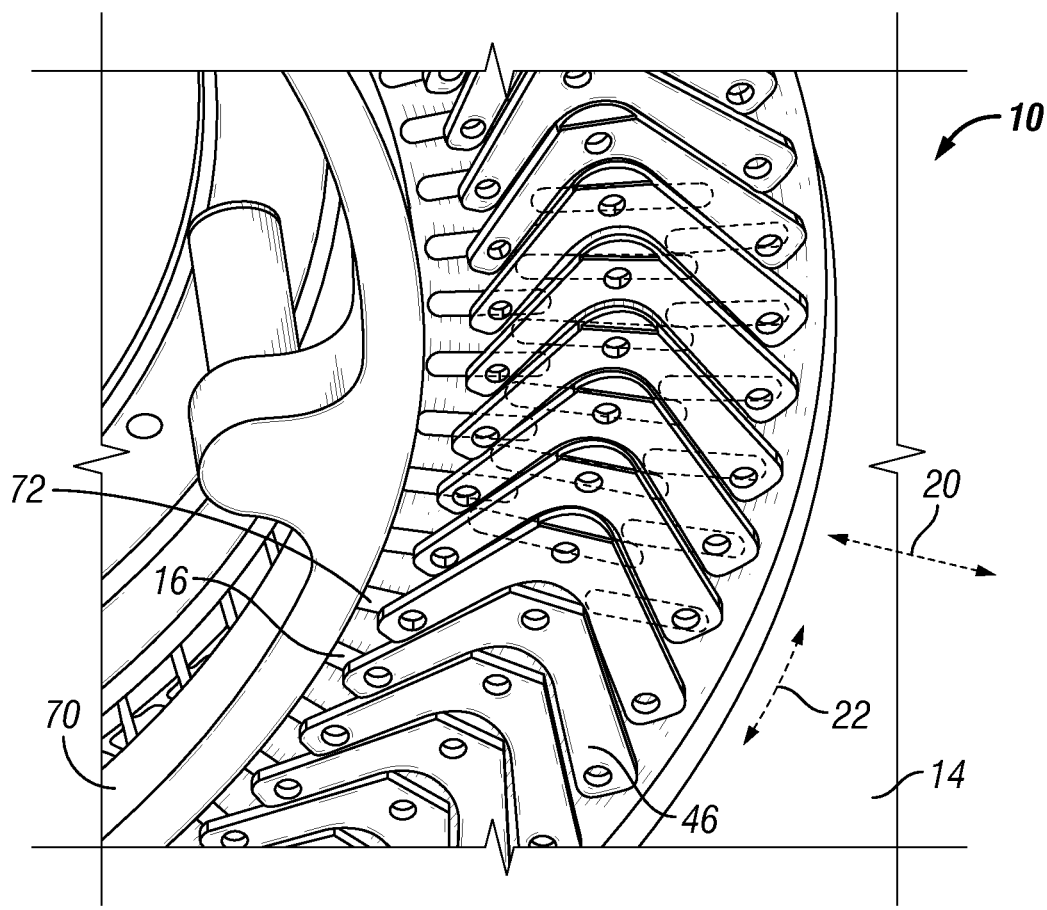
FIG. 10 is a bottom perspective view of a portion of the apparatus.

FIG. 10 is a bottom view of the apparatus 10 in which a series of coupling members 46 are attached to the elements 16. A portion of the base 14 may be located between the elements 16 and the coupling members 46. As shown in FIG. 10, coupling member 46 is connected at two locations to element 16. In other embodiments the coupling member 46 may be connected to element 16 at but a single location. A couple member 46 is associated with, and connected to, each one of the elements 16 of the apparatus 10, and there may be the same number of elements 16 as there are coupling members 46. Each of the coupling member 46 can extend in the circumferential direction 22 beyond the element 16 to which it is attached, and the coupling members 46 can be nested within adjacent coupling members 46. As one of the elements 16 moves in the radial direction 20 due to movement of the attached element 16, this coupling member 46 may engage an adjacent coupling member 16 and cause the element 16 to which it is attached to likewise move. Coupling members 46 can be used on all of the elements 16 of the apparatus 10 so that all of the elements 16 move together inward and outward in the radial direction 20 when one of the elements 16 is moved inward or outward. In some instances, clearances may be present between the coupling members 46 so that they do not immediately cause movement when one of them moves. By linking all of the elements 16 to one another via the coupling members 46, a move uniform and distributed movement of the elements 16 results so that variances in dimensions and force application uniformity by the radial movement member 24 can be accounted for in the build process.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus that includes components of a non-pneumatic tire, comprising:
    a base;
    a plurality of elements that move relative to the base, wherein the plurality of elements have a central axis, wherein the elements move in a radial direction towards and away from the central axis, wherein the elements are disposed in a circumferential direction around the central axis, wherein each one of the elements has a radially inner half and a radially outer half, and wherein the radially inner half has a projection;
    a radial movement member;
    a hub; and
    a plurality of spokes, wherein each one of the spokes is disposed between adjacent ones of the elements such that the spokes engage both the radially inner half and the radially outer half, wherein the elements and the spokes are moved inwards in the radial direction by the radial movement member towards the central axis so that the spokes are moved in the radial direction towards the hub, wherein adhesive engages the spokes and the hub at an attachment location of the spokes and the hub, wherein the projection engages the spoke at a flange of the spoke at an inner radial end of the spoke to urge the inner radial end from a disengaged state into engagement with the hub at the attachment location.

2. The apparatus as set forth in claim 1, wherein the base is rectangular in shape, and wherein the base has a central aperture through which the central axis extends.

3. The apparatus as set forth in claim 1, wherein the radial movement member comprising a plurality of pneumatic bladders that are disposed circumferentially around the central axis, wherein the pneumatic bladders are located outward from the elements and the spokes in the radial direction.

4. The apparatus as set forth in claim 3, wherein three pneumatic bladders are present, wherein a longitudinal direction is parallel to and extends in the direction of the central axis, wherein the three pneumatic bladders are spaced from one another in the longitudinal direction and are not in engagement with one another.

5. The apparatus as set forth in claim 4, wherein three pneumatic bladders are present and inflate sequentially relative to one another such that one of the pneumatic bladders first begins inflation followed by one of the pneumatic bladders that is located between the other two pneumatic bladders in the longitudinal direction, wherein the final one of the three pneumatic bladders begins inflation after the one of the pneumatic bladders located between the other two pneumatic bladders in the longitudinal direction begins inflation.

6. The apparatus as set forth in claim 3, wherein inflation of the pneumatic bladders causes the elements and the spokes to be moved inward in the radial direction, wherein the pneumatic bladders engage both the elements and the spokes.

7. The apparatus as set forth in claim 3, wherein inflation of the pneumatic bladders causes the pneumatic bladders to engage the elements, wherein inflation of the pneumatic bladders does not cause engagement of the pneumatic bladders and the spokes, wherein the elements extend outward in the radial direction beyond the spokes.

8. The apparatus as set forth in claim 1, wherein the elements have tabs on lower ends of the elements that are disposed within slots of the base, wherein the elements have stops that are engaged by the spokes and limit movement of the spokes towards the base.

9. The apparatus as set forth in claim 1, wherein the elements and the spokes have V-shaped cross-sectional profiles, wherein the elements have larger cross-sectional profiles than the spokes, wherein a shape of the cross-sectional profiles of the elements is different than a shape of the cross-sectional profiles of the spokes.

10. The apparatus as set forth in claim 1, wherein the spokes are spaced from elements adjacent the spokes in the circumferential direction a greater amount at the radially outer half of the spokes than at the radially inner half of the spokes, wherein the radially outer half of the spokes are located farther from the central axis in the radial direction than the radially inner half of the spokes.

11. The apparatus as set forth in claim 1, further comprising a plurality of coupling members that are V-shaped and are nested within one another, wherein the number of coupling members present is the same as the number of elements present, wherein each one of the coupling members is attached to one of the elements, wherein the coupling members are located at bottoms of the elements, wherein radial movement of the elements causes the coupling members to move in the radial direction and engage one another to in turn cause other elements to move in the radial direction.

12. The apparatus as set forth in claim 1, wherein the adhesive is located on the hub before the spokes are moved into engagement with the adhesive.

13. The apparatus as set forth in claim 1, wherein the projections nest within complimentary notches of the spokes, wherein the elements are free from engagement with the hub when the elements are moved into a position closest to the central axis in the radial direction.

14. The apparatus as set forth in claim 1, wherein each one of the elements simultaneously engages the flanges of two adjacent spokes.

\* \* \* \* \*